United States Patent [19]

Klein

[11] Patent Number: 5,059,088
[45] Date of Patent: Oct. 22, 1991

[54] SUCTION LIFTER FOR A MATERIAL HANDLING DEVICE

[76] Inventor: Manfred Klein, Richard-Wagner Str. 16, D-7255 Ruresheim, Fed. Rep. of Germany

[21] Appl. No.: 459,707
[22] PCT Filed: Jun. 23, 1988
[86] PCT No.: PCT/DE88/00375
§ 371 Date: Mar. 14, 1990
§ 102(e) Date: Mar. 14, 1990
[87] PCT Pub. No.: WO89/00965
PCT Pub. Date: Feb. 9, 1989

[30] Foreign Application Priority Data

Jul. 28, 1987 [DE] Fed. Rep. of Germany ....... 3724878

[51] Int. Cl.[5] ............................................. B65G 47/91
[52] U.S. Cl. ................................................... 414/627
[58] Field of Search ............... 414/627, 737, 752, 793, 414/797; 901/40

[56] References Cited

U.S. PATENT DOCUMENTS

| 2,247,787 | 7/1941 | Schmidt | 414/627 |
| 2,665,013 | 1/1954 | Socke | 414/627 |
| 3,076,561 | 2/1963 | Rogers | 414/627 |
| 3,107,794 | 10/1963 | Bechtold et al. | 414/797 X |
| 3,899,087 | 8/1975 | Tamble et al. | 414/752 |

FOREIGN PATENT DOCUMENTS

| 0129732 | 1/1985 | European Pat. Off. | 414/627 |
| 2266648 | 10/1975 | France | 414/793 |
| 1337743 | 11/1973 | United Kingdom . | |

Primary Examiner—David A. Bucci
Assistant Examiner—James Keenan
Attorney, Agent, or Firm—McGlew & Tuttle

[57] ABSTRACT

According to the invention, a suction lifter for a material handling device is provided for work pieces with suction surfaces. At least one pneumatic, double acting working cylinder is provided with a suction cup arranged at an end of the piston rod. A piston of the working cylinder is provided cooperating with the cylinder to define a first working chamber, opposite the suction cup, and a second working chamber, adjacent to the suction cup. A directional control is provided for controlling a connection between the compressed air source and the working cylinder and for venting the working cylinder. The directional control includes a pressure reducing arrangement for the suction cup. The first working chamber is connected to the suction cup via a throttle valve and a 4/2-way valve is employed for controlling direction, the valve connecting the first working chamber to a vacuum device and connecting the second working chamber to a compressed air source in one switching position and in a second switching position the valve connecting the first working chamber to the compressed air source and directing the second working chamber to the vacuum device.

10 Claims, 3 Drawing Sheets

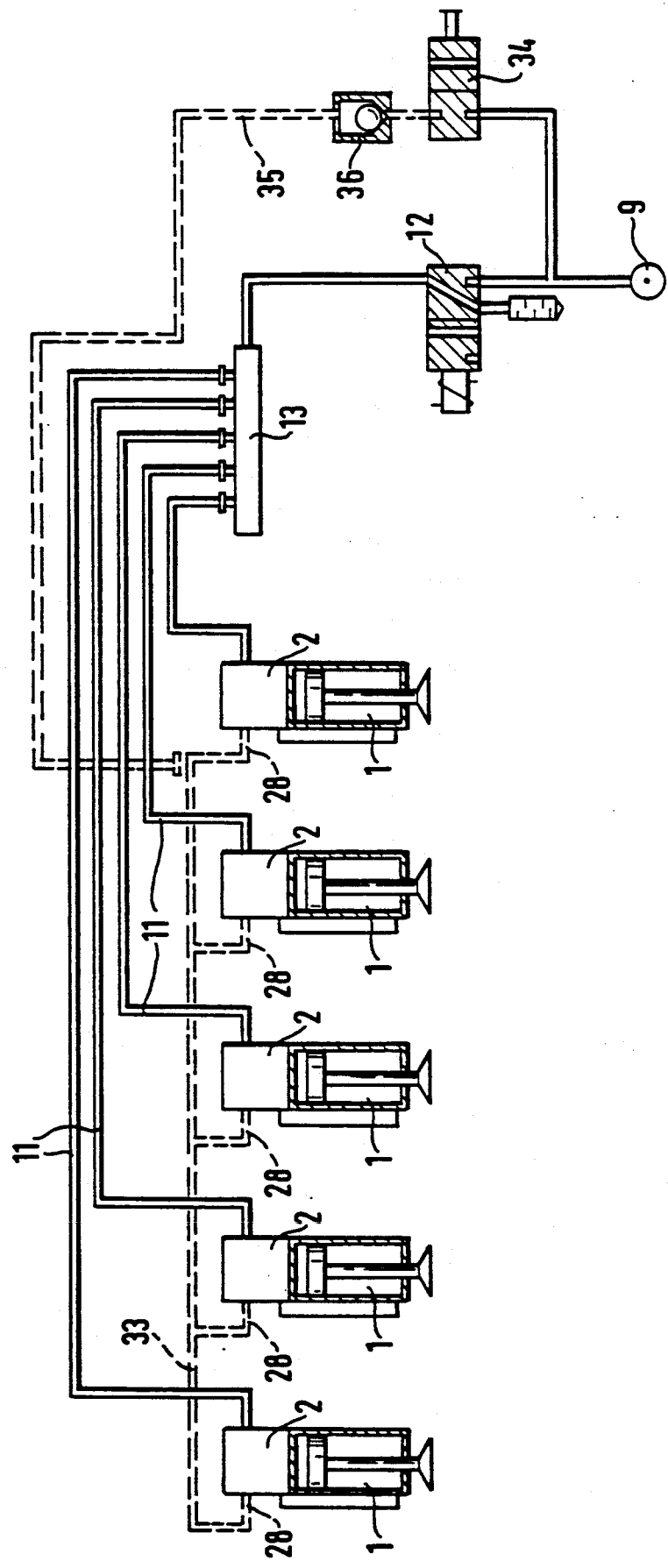

SUCTION LIFTER FOR A MATERIAL HANDLING DEVICE

BACKGROUND OF THE INVENTION

1. Field of the Invention

The present invention pertains to a suction lifter for a material handling device for workpieces, comprising suction surfaces and at least one pneumatic cylinder with a suction cup arranged at its end.

2. Description of the Prior Art

Arrangements are known in which workpieces are sucked up and lifted with such suction lifters for subsequent transportation in manufacture. This is common practice, e.g., in sheet metal fabrication, where a cut-out piece of sheet metal is lifted out of the basic sheet metal for further processing using the suction lifter. Subsequently, either the basic sheet metal or the piece cut out is removed. After positioning, the workpiece is again released by the suction lifter for further processing. It is possible, for example, to arrange a series of such suction lifters in parallel in order to pick up pieces punched out from a large sheet metal plate. It is also known that using appropriate controls, it is possible to pick up only some of the pieces punched out or to activate only some of the suction lifters present.

In a prior-art suction lifter of this class, in which the working cylinder is designed as a constant-pressure cylinder, the piston rod passes through both end faces of the cylinder, and the piston rod, which is of hollow design, carries the suction cup at one of its ends. A connection for the vacuum, which connection is controlled via a directional control valve, is provided at the other end of the piston rod. The stroke of the suction cup is also controlled via a directional control valve, which connects the pressure source or the vent hole with the first working chamber or with the second working chamber.

The control system for such a suction lifter is relatively expensive, because there are two directional control valves operating independently of one another for each suction lifter, and the directional control valves must be finely coordinated with one another and with other valves of the suction lifter. This makes the entire control device complicated and requires a number of additional position transducers.

SUMMARY AND OBJECTS OF THE INVENTION

The suction lifter according to the present invention, has the advantage over prior art arrangements in that only one directional control device is required and the control tasks of the second directional control device are integrated as an automatic control by connecting the first working chamber to the suction cup. The use of only one directional control device makes it possible to substantially simplify the control, because various displacement pickups are no longer necessary, so that program control components can also be eliminated.

According to another embodiment of the present invention, a check valve closing in the direction of the working chamber is arranged in the line between the second working chamber and the directional control device, and the check valve is bypassed by a bypass line, in which a pneumatic time function element is present in the direction of the directional control device. It is thus achieved that the lift with the workpiece sucked up takes place in a controlled manner.

According to another advantageous embodiment of the present invention, a 4/2-way valve is controlled pneumatically, and the dynamic pressure is taken from the line provided between the 4/2-way valve and the first working chamber via a pressure valve and a control line. The pressure valve is set so that it opens only when the suction cup lies upon the workpiece, as a result of which the pressure in the corresponding line rises, so that due to this automation, the switching into the lifting direction always takes place only when the suction cup indeed lies on the workpiece.

According to another advantageous embodiment of the present invention, a plurality of working cylinders are provided, and a control block is connected to each of the working cylinders so that additional lines can be dispensed with. One such control block comprises the 4/2-way valve with the entire control device, the time function element, and an injector nozzle, with which the vacuum is generated. Each of these control blocks has a main line leading to the pressure source, and a 3/2-way valve is provided in the main line. Due to the working cylinder being directly connected to the control block, the communicating lines used are direct channels in the housing of the control block rather than flexible hoses or tubes, so that the number of sources of error may decrease, the risk of contamination is reduced, and costs are reduced as well.

Further advantages and advantageous embodiments of the present invention can be found in the following description, the drawing, and the claims.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 3 is a circuit diagram of a plurality of suction lifters connected together.

DESCRIPTION OF THE PREFERRED EMBODIMENTS

Figure 1:
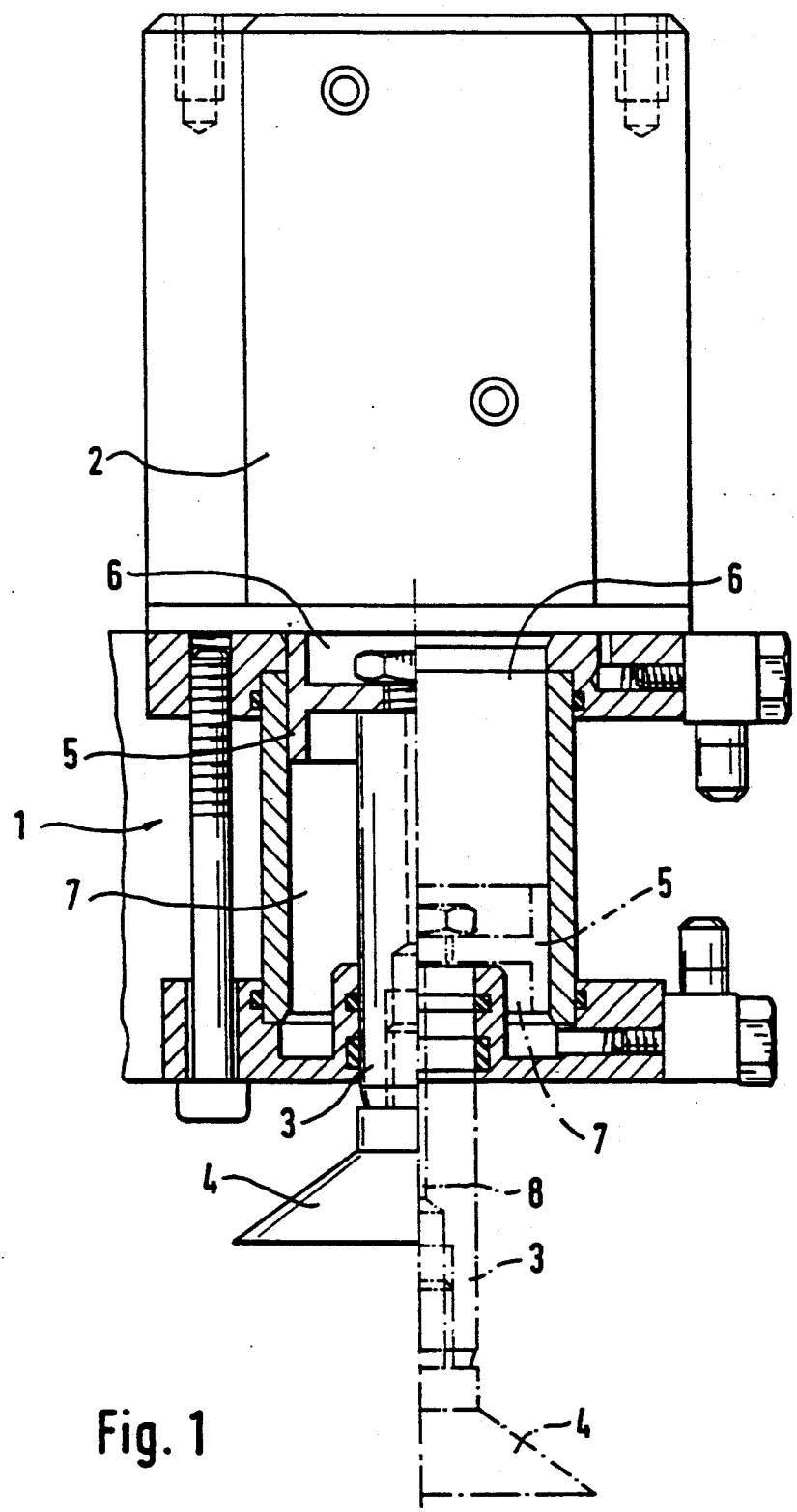
FIG. 1 is a the longitudinal sectional view of a working cylinder with a suction cup.

In the suction lifter shown in FIG. 1, a pneumatic control device 2 is flanged onto a working cylinder 1 and is pneumatically connected thereto via channels (not shown). A suction cup 4 is fastened at the free end of the piston rod 3 of the working cylinder 1. The side of the piston rod 3 turned away from the suction cup 4 is fastened to a piston 5. The piston 5 subdivides the working cylinder into a first working chamber 6 and a second working chamber 7. The first working chamber 6 is connected via a central bore 8 of the piston rod 3 to the inner space of the suction cup 4. The two working chambers 6 and 7 are connected to the control block 2 via channels. The working cylinder 1 is represented in two working positions, namely, the withdrawn position in the left-hand half of the section, and the extended position in the right-hand half.

Figure 2:
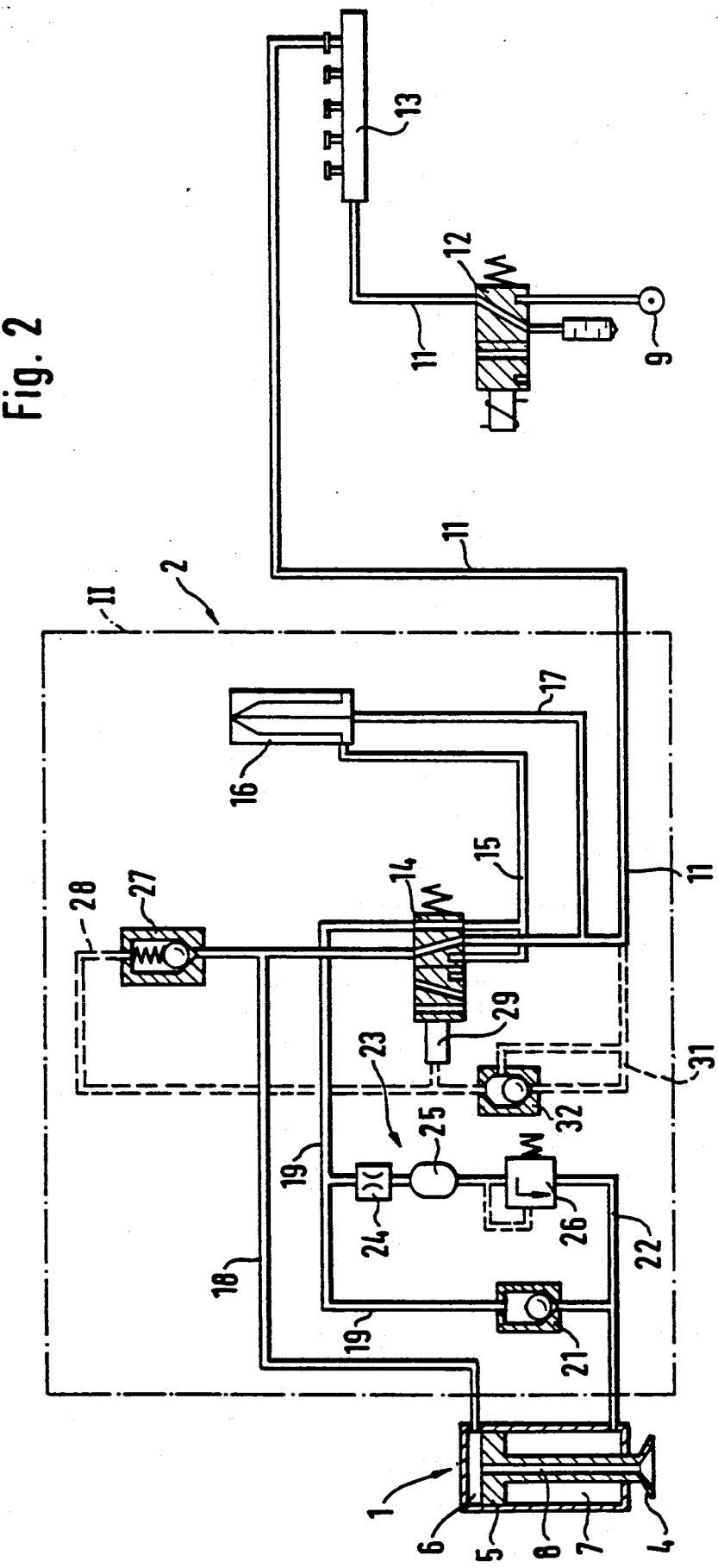
FIG. 2 is a circuit diagram of a suction lifter with control block.

FIG. 2 shows, within the box II drawn in dash-dotted line, a circuit diagram of the pneumatic control block 2, i.e., the insides of the block, which are accommodated in the known manner, in the housing, which is shown only as a plan view in FIG. 1. To the left in the Figure, the working cylinder 1 is connected to the pneumatic control block, and, shown in the right-hand side of the Figure, a compressed air source 9 is connected via a main line 11, in which a 3/2-way solenoid valve is provided, and a distributor 13 with connections to further suction lifters is connected.

The control block 2 contains a pneumatically controlled 5/2-way valve 14, which may also be replaced by a 4/2-way valve. The directional control device 14 is connected to the main line 11 and to a suction line 15 of an injector nozzle 16, in which vacuum is generated for the suction line 15 via a blow line 17, which is branched off from the main line 11. On the other side, the directional control device 14 is connected to the first working chamber 6 via a first working line 18 and to the second working chamber 7 of the working cylinder 1 via a second working line 19. The second working line 19 contains a check valve 21 closing in the direction toward the second working chamber 7. In addition, the second working line 19 also has a bypass 22, which contains a time function element 23 consisting of a throttle 24, a storage unit 25, and a pressure valve 26, which are connected in series in the direction of the second working chamber 7.

A control line 28, which leads to the pneumatic servomotor 29 of the directional control device 14, is branched off from the working line 18 downstream of a pressure-reducing valve 27. A relief line 31 leads from the control line 28 to the main line 11, and a check valve 32 opening toward the main line 11 is arranged in the relief line 31.

The suction lifter according to the present invention operates as follows. As soon as the compressed air source 9 is connected to the pneumatic control block 2 by the solenoid valve 12, the compressed air flows via the main line 11 through the blow line 17 to the injector nozzle 16, on one hand, and via the first working line 18 to the working chamber 6 of the working cylinder 1, on the other hand. The second working line 19 and its bypass 22, as well as the suction line 15 are connected to the injector nozzle 16. The piston 5 of the working cylinder 1 is displaced from the starting position, as shown in the left-hand part of FIG. 1, into the working position, as is represented in the right-hand part. During this stroke, the suction cup 4 hits the surface of a workpiece, so that the air, which before could flow off throttled by and via the central bore 8 of the piston rod 3 and the open suction cup 4, becomes stagnant. This stagnation leads to an increase in the pressure in the second working line 18, so that the pressure valve 27 opens beginning from a certain dynamic pressure and compressed air enters the pneumatic servomotor 29 via the control line 28. The check valve 32 remains closed because of the higher pressure in the main line 11. When this dynamic pressure exceeds a certain limit value, the directional control device 14 switches over, so that the compressed air source 9 is connected via the second working line 19 and its bypass 22 and the time function element 23 to the second working chamber of the working cylinder 1, because the check valve 21 in the second working line 19 closes. The compressed air is now metered into the second working chamber 7 by the time function element 23, so that the lifting movement of the piston 5 and the suction cup 4, including the workpiece (not shown), is controlled. The time function element 23 includes the throttle 24, the storage unit 25 and the pressure valve 26 as discussed above. The compressed air is supplied by the working line 19 to the throttle 24 and thereafter fills the storage unit 25. When a certain pressure is reached in the storage unit 25, the pressure valve 26 opens and supplies the compressed air via line 22 to the second working chamber 7. When the compressed air is delivered to the working chamber, the piston 5 and the suction cup 4 are lifted into their initial or starting position. The time delay provided by time function element 23 between the engaging or hitting of the surface of the work piece and the lifting of the piston 5 and the suction cup 4, depends on the opening pressure of the pressure valve 26 which of course can be adjusted. The first working chamber 6 is connected via the working line 18 and the suction line 15 to the injector nozzle 16, so that the vacuum needed for maintaining the suction is generated in the working chamber 6. This working state is then maintained until the workpiece is either transported to the desired place or the necessary change has taken place under the workpiece.

To release the workpiece, the solenoid valve 12 is again switched into the starting position shown, so that the pneumatic pressure is abolished in the main line 11 via the blow line 17. The workpiece is now dropped over the intended place. The directional control device 14 will subsequently switch over into the starting position, because the check valve 32 is able to open unhindered.

FIG. 3 shows as an example 5 pneumatic control blocks 2 connected in parallel with their respective working cylinder 1 due to corresponding main lines 11 emerging from the distributor 13. In addition, a common control line 33 is provided, which emerges from the control line 28 of one of the pneumatic control blocks 2 and the control lines 28 are branched off from this control line 33. If a workpiece is smaller than the surface area that is covered by the suction devices connected in a row, the suction devices which have not come into contact with any workpiece can now be switched over. This is brought about by the working suction device from the row, which has come into contact with and sucked up a workpiece, via the control line 28. When one of the suction device hits the surface of a workpiece compressed air flows over valve 27 into the control line 28 of the suction device and switches to the pneumatic valve 14. As a common control line 33 is provided, the compressed air flows into the control line 28 of the other suction devices of the row and thereby the pneumatic valves 14 of these additional suction devices are also switched. Without this common control line 33, suction devices which do not hit the surface of a work piece would not be switched and associated pistons 5 would not be lifted. A programming unit would be needed in this case to control the function of the suction devices. Programming, which is otherwise commonly performed, can thus be eliminated. The compressed air source 9 can be connected via a 2/2-way valve 34, which can be actuated as desired, to the control line 33 and the control lines 28 via a control line 35, so that an arbitrary switching of the directional control devices 14 can take place. A check valve 36 is provided in the control line 35.

All the characteristics represented in the description, the following claims, and the drawing can be essential for the present invention both alone and in any combination with one another.

While specific embodiments of the invention have been shown and described in detail to illustrate the application of the principles of the invention, it will be understood that the invention may be embodied otherwise without departing from such principles.

I claim:

1. A suction lifter for a material handling device for workpieces with surfaces engageable with a suction element, comprising:

a pneumatic, double-acting working cylinder with a piston rod having a suction cup arranged at a piston rod end, and a piston at the other end of the piston rod, said piston cooperating with said working cylinder to define a first working chamber between said piston and the end of said cylinder spaced away from said suction cup and a second working chamber between said piston and the end of said cylinder adjacent said suction cup, said first working chamber being connected to said suction cup via a throttle line;

directional control means for controlling a connection between a compressed air source and the working cylinder and for venting the working cylinder, including 4/2-way valve means for connecting, in a first switching position, said first working chamber to a vacuum device and connecting said second working chamber to said compressed air source and for connecting, in a second switching position, said first working chamber to said compressed air source and connecting said second working chamber to said vacuum device.

2. A suction lifter according to claim 1, wherein said vacuum device includes an injector nozzle, supplied with air from said compressed air source to generate a vacuum.

3. A suction lifter according to claim 1, wherein said throttle line is provided as a central bore formed in said piston rod, said central bore having an opening opposite said suction cup, providing said connection between said first working chamber and said suction cup.

4. A suction lifter according to claim 1, wherein said 4/2-way valve means is connected to said second working chamber via a line including a first branch with a check valve which closes in a direction of said working chamber and a second branch, bypassing said check valve, said second branch including time function element means for providing a time delay in change of air pressure between said directional control device and said second working chamber.

5. A suction lifter according to claim 4, wherein said time function element means includes a throttle, a storage unit and a pressure retaining valve each being connected in said second branch in series.

6. A suction lifter according to claim 1, wherein said directional control means includes a pneumatic actuator responsive to a control pressure, said directional control means being connected to said first working chamber over a first working line, said first working line having a pressure valve connecting said first working line to a control line, said control line providing said control pressure to said pneumatic actuator.

7. A suction lifter according to claim 6 wherein said control line is connected to a main line for supplying compressed air from said compressed air source, over an additional check valve, said additional check valve releasing pressure in said control line to said main line.

8. A suction lifter according to claim 4 wherein a plurality of working cylinders are provided each connected to a control block including each of said directional control means, said time function element means and said vacuum device, said control block being connected to each of said working cylinders.

9. A suction lifter according to claim 8, wherein a compressed air distributor is arranged downstream of said compressed air source, said compressed air distributor including a plurality of individual main lines connected to each of said control blocks, a 3/2-way valve being provided upstream of said compressed air distributor.

10. A suction lifter according to claim 8 wherein a common control line is connected to each of said individual control blocks, said common control line being supplied with air pressure via a valve connectible to said air pressure source.

* * * * *